Dec. 29, 1942.   V. A. BENSON   2,306,517

BARBECUE SPIT

Filed May 17, 1941

INVENTOR
Victor A. Benson
John A. Naismith
ATTORNEY

UNITED STATES PATENT OFFICE 2,306,517

BARBECUE SPIT

Victor A. Benson, Mountain View, Calif.

Application May 17, 1941, Serial No. 393,985

1 Claim. (Cl. 53—5)

The present invention relates particularly to means for effecting the mechanical rotation of a spit of the type used on barbecue stoves and the like.

In the barbecuing of meats it is common practice to journal the spit in upright standards and then rotate the spit by hand through the medium of a crank. This manual operation of the spit is, however, a very tedious and irksome process, largely because the spit should be rotated at a fairly uniform rate of speed and for quite a long period of time, the time required depending, of course, upon the size of the piece being barbecued.

It is one object of the present invention, therefore, to provide means whereby the spit can be rotated at a uniform speed for any desired period of time without the use of manual labor.

It is another object of the invention to provide means of the character indicated constructed and arranged to permit its quick and easy assembly in operative relationship to the barbecue grill frame, and its quick and easy detachment therefrom.

It is also an object to provide means of the character indicated that will be economical to manufacture, that consists of few parts, that is simple in form and construction, strong, durable, and highly efficient in its practical application.

Figure 1:
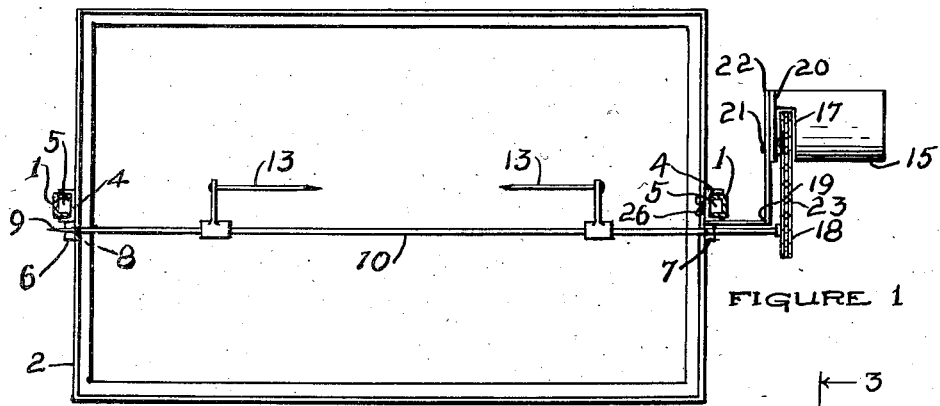
Figure 1 is a top plan view of a barbecue grill frame in position on its supporting standards and with a spit assembly embodying my invention mounted thereon.
Figures 2, 4:
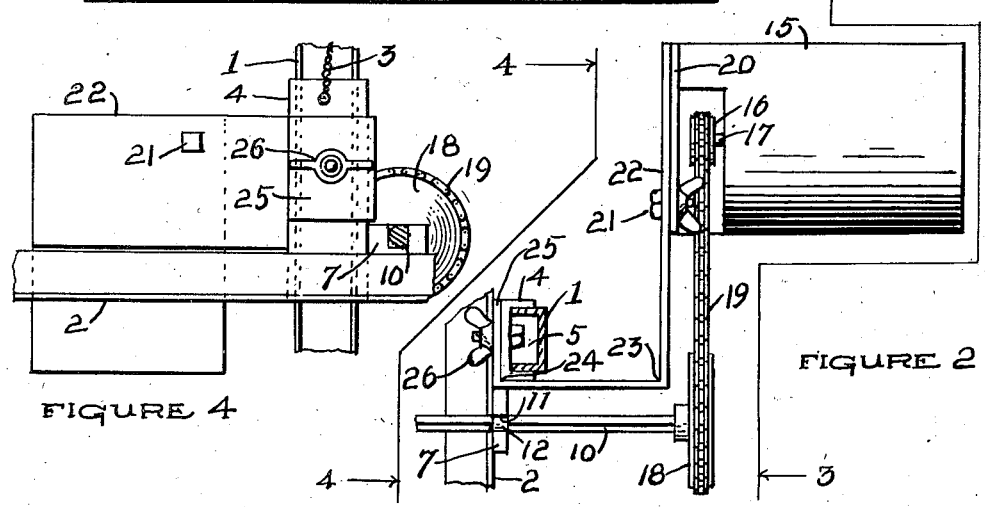
Figure 2 is an enlarged top plan view of a portion of the assembly shown in Figure 1, showing the spit mounting and driving mechanism.
Figure 4 is a view on line 4—4 of Figure 2, with parts broken away.
Figure 3:
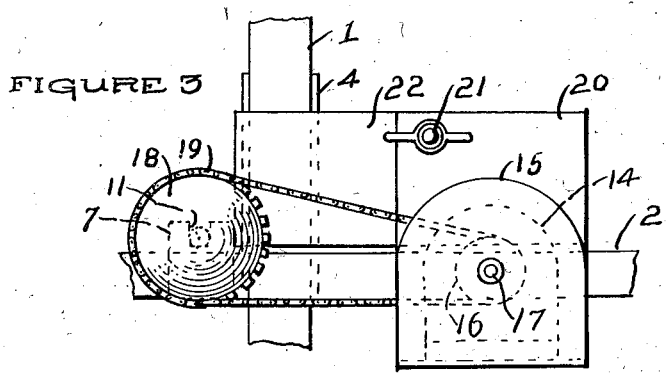
Figure 3 is a side elevation of the structure at 3—3, Figure 2, with parts broken away.

In the particular embodiment of the invention herein disclosed I show at 1 the fixed vertical standard upon which the grill frame 2 is mounted to move vertically by means of hoisting devices not shown, through the medium of cables as 3. The standard 1 is made of U bars placed with the flanges turned inwardly, and the frame 1 has a U bar section 4 mounted on each end thereof with its flanges directed outwardly to overlap the inwardly directed flanges on the standard and to slide thereon, forming a pocket 5. The channel sections 4 are sufficiently long to maintain the frame 2 in a horizontal plane.

On the ends of the frame 2, and close to the parts 4, are mounted bearing members 6 and 7, these members projecting a little above the top plane of the said frame 2. The bearing member 6 has a hole drilled therethrough as at 8 to receive the pointed end 9 of the spit 10. The other member 7 has a socket 11 formed in its top edge to receive the rounded portion 12 of the spit which is otherwise square in cross-section throughout its length. The round portion 12 of the spit is slightly longer than the thickness of the bearing 7 so that when the pointed end 9 of the spit is inserted in the hole 8 the rounded portion 12 will drop into the bearing 7. This method of assembly permits the free rotation of the spit in its bearings but at the same time effectually prevents longitudinal movement therein. On the spit 10 are slidably mounted the meat supporting prongs as 13.

The spit is operated by means of an electric motor encased in a housing as 15, the motor 14 being of the geared-down type and having a sprocket 16 on its shaft 17. The small sprocket 16 is drivingly connected to a larger sprocket 18 on spit 10 by means of a chain 19.

The motor housing 15 is mounted on an end plate 20 which in turn is pivotally mounted as at 21 on a bracket 22. The mounting at 21 consists of a bolt and wing-nut so placed that when the nut is loosened and the housing 15 swung toward the spit sprocket 18 the chain will be loosened sufficiently to permit its removal from the sprocket 18.

The bracket 22 upon which the motor is mounted is bent at right-angles at 23 and again at 24 to provide an end part 25 disposed to seat upon the adjacent bar section 4 and to which it is removably secured by means of a bolt and wing-nut 26.

By means of the construction described the motor is quickly and easily attached to or removed from the grill frame by manipulation of the wing-nut 26, yet when in position the motor is rigidly held in position relative to the sprocket 18. The sprocket 18 is rigidly mounted on the end of spit 10 and may be used as a handle for turning the spit, yet the drive chain 19 may be quickly and easily placed thereon or removed therefrom by manipulation of the bolt 21. By placing the part 4 astride of the part 1 a pocket 5 is formed which accommodates the head of the bolt 26.

Having thus described my invention, what I claim as new and desire to secure by Letters Patent is:

A structure of the character described comprising, supporting means including vertical and parallel channel irons having their flanges directed inwardly toward each other, a grill frame disposed in a horizontal plane between said irons, channel iron sections mounted vertically on said frame at its ends with their flanges directed outwardly to overlap and slidably engage the outer sides of the supporting means, a bracket removably mounted on the inner surface of one of said sections above the plane of the frame and bent to extend outwardly therefrom at right angles thereto and thence angularly into parallel relation with the end of the frame, a plate pivotally mounted on the last named end of the bracket to swing in a plane parallel therewith and means for securing said plate against swinging, an electric motor mounted on said plate and having a sprocket mounted on its shaft, a spit rotatably mounted on the grill frame in parallel relation with its longer axis and having a sprocket mounted on one end thereof, and a chain drivingly connecting the spit sprocket and the motor sprocket.

VICTOR A. BENSON.